United States Patent

Takeda et al.

[11] Patent Number: 5,948,866
[45] Date of Patent: Sep. 7, 1999

[54] POWDER PAINT COMPOSITION AND APPLICATION METHOD THEREFOR

[75] Inventors: Hirofumi Takeda, Yao; Ikuo Nakaya, Kishiwada; Michiya Sugiyama, Izumiotsu; Akio Shoji, Takaishi, all of Japan

[73] Assignee: Dainippon Ink and Chemicals, Inc., Tokyo, Japan

[21] Appl. No.: 08/894,449

[22] PCT Filed: Dec. 19, 1996

[86] PCT No.: PCT/JP96/03698

§ 371 Date: Aug. 19, 1997

§ 102(e) Date: Aug. 19, 1997

[87] PCT Pub. No.: WO97/23573

PCT Pub. Date: Jul. 3, 1997

[30] Foreign Application Priority Data

Dec. 21, 1995 [JP] Japan .................................... 7-333239
Nov. 12, 1996 [JP] Japan .................................... 8-300247

[51] Int. Cl.$^6$ ........................................ C08E 8/00
[52] U.S. Cl. .................. 525/194; 525/197; 525/203; 525/204; 525/208; 525/217; 525/172; 525/176
[58] Field of Search ................... 525/194, 197, 525/203, 204, 208, 217; 427/407.1

[56] References Cited

U.S. PATENT DOCUMENTS 4,988,767  1/1991  Pettit, Jr. ................................. 525/194
5,270,391  12/1993  Miyazaki et al. ...................... 525/194

FOREIGN PATENT DOCUMENTS 0 544 206  6/1993  European Pat. Off. .
51-42730  4/1976  Japan .
5-230404  9/1993  Japan .

*Primary Examiner*—Mark L. Warzel
*Attorney, Agent, or Firm*—Armstrong, Westerman, Hattori, McLeland and Naughton

[57] ABSTRACT

A powder paint composition and application method therefor are provided which can form a paint coating which has superior mar resistance and for which the external appearance, such as its smoothness and sharpness, is excellent.

This paint powder composition comprises a multi-functional vinyl-type copolymer (A) which has a glass transition temperature of 40° C. and which contains functional groups which are reactable with carboxylic acid; a polycarboxylic acid (B); and a multi-functional vinyl-type copolymer (C) which has a glass transition temperature of 0° C. and which contains functional groups which are reactable with carboxylic acid.

6 Claims, No Drawings

POWDER PAINT COMPOSITION AND APPLICATION METHOD THEREFOR

FIELD OF THE INVENTION

The present invention relates to a new and useful powder paint composition and to a new and useful application method. In more detail, the present invention relates to a powder paint composition having a form in which a multi-functional vinyl-type copolymer which contains a specific functional group which is reactable with carboxylic acid has been added to a polycarboxylic acid and a different multi-functional vinyl-type copolymer which contains a functional group which is reactable with carboxylic acid. In addition, it relates to an application method in which a paint coating is formed by applying this powder paint composition onto a paint coating formed by a water-based paint. Furthermore, it relates to an application method in which the paint coating is formed by applying this powder paint composition to which a compound having a specific reactive organic group has been additionally added. This powder paint composition and application method have extremely high utility and provide a paint coating which is superior in smoothness, sharpness, appearance and the like, and which is superior in mar resistance and the like.

BACKGROUND OF THE INVENTION

A powder paint having a form in which a vinyl polymer which contains an epoxy group is used as the resin component and a polycarboxylic acid compound is used as the hardening agent component is used in a wide range of applications because it can form a paint coating which is particularly superior in weather resistance.

However, this type of powder paint has the disadvantage of being inferior in mar resistance and the like, and when attempts are made to improve this mar resistance and the like, the appearance and the like of the paint coating become easily degraded, as a result, it is difficult to obtain a balance of all properties.

Furthermore, when powder paint is applied to a base-coat layer formed by the application of a water-based paint, smoothness of the paint and the like are seriously impaired, defects in the paint coating, such as orange peel, craters, pinholes and the like, are produced. As a result, in reality, it is only possible to obtain a paint coating which is very unsatisfactory from the point of view of the balance of properties of appearance and mar resistance.

In this way, in line with the limitations of conventional techniques as described above, it has been virtually impossible to realize a powder paint composition, and an application method for this composition, which has extremely high utility, is superior in the mar resistance and the like of the paint coating, is superior in the appearance of the paint coating and, in addition, is also superior in the smoothness and sharpness of the paint coating.

In addition, even in situations when a powder paint has been applied to a so called water-based base-coat layer, in which a water-based base-coat paint coating is applied, it has been virtually impossible to realize a powder paint composition, and application method therefor, which has extremely high utility, and which gives this type of paint coating which has a balance of both properties of appearance and mar resistance.

Nevertheless, the inventors of the present invention began research in earnest in order to realize the establishment of a powder paint composition, and an application method for this composition, which has extremely high utility, and for which the mar resistance and the like of the paint coating is superior, the appearance and the like of the paint coating is superior and, in addition, the smoothness and sharpness of the paint coating is superior even when the powder paint is applied to a water-based base-coat layer.

Consequently, the problem solved by the present invention is the provision of a powder paint composition which has extremely high utility, which achieves a balance of both properties of mar resistance and appearance of the paint coating in particular and, of course, which is superior in the sharpness and smoothness of the paint coating; and the provision of an application method for this composition.

DISCLOSURE OF THE INVENTION

The inventors of the present invention set the above-mentioned problem as their goal and, as the result of earnest and continued research, they discovered a new paint composition which comprises a polycarboxylic acid; a specific multi-functional vinyl-type copolymer having a functional group which is reactable with a carboxylic acid; and a specific multi-functional vinyl-type copolymer which is different to the above-mentioned multi-functional vinyl-type copolymer; and, moreover, which may also contain a compound which has a specific reactive organic group. This new paint composition exhibits all of the above-mentioned superior properties and has very high utility. In addition to this, they also discovered a new application method which provides a paint coating which has an appearance which is smooth, sharp in color, and so on, is without defects, and which is superior in mar resistance. As a result the present invention was achieved in its completeness.

In more detail, the present invention provides a powder paint composition comprising, as an essential coat-forming component, a resin composition obtained by adding a multi-functional vinyl-type copolymer (C), which has a glass transition temperature of 0° C. or lower and which has a functional group which is reactable with a carboxylic acid, to a composition which contains, as essential coat-forming components, a polycarboxylic acid (B) and a multi-functional vinyl-type copolymer (A), which has a glass transition temperature of 40° C. or greater and which has a functional group which is reactable with carboxylic acid.

In addition, the present invention provides a powder paint composition obtained by adding a multi-functional vinyl-type copolymer (C), which has a glass transition temperature of 0° C. or lower and which has a functional group which is reactable with a carboxylic acid, to a composition which contains, as essential coat-forming components, a polycarboxylic acid (B) and a multi-functional vinyl-type copolymer (A), which has a glass transition temperature of 40° C. or greater and which has a functional group which is reactable with carboxylic acid; and by additionally adding, also as an essential coat-forming component, a chemical compound (D) which has at least one reactable functional group per molecule which is represented by either of the following general formula [I-1]:

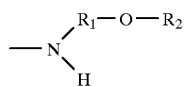

[I-1]

(wherein R1 represents a group comprising —CH$_2$— or —CH$_2$CH$_2$— and R2 represents a hydrogen atom or an alkyl group of 1–12 carbons)

or the following general formula [I-2]:

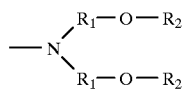

[I-2]

(wherein R1 represents a group comprising —CH$_2$—or —CH$_2$CH$_2$— and R2 represents a hydrogen atom or an alkyl group of 1–12 carbons)

In addition, the present invention provides an application method for a powder paint composition comprising forming a paint coating by applying the various above-mentioned powder paint compositions to a paint coating formed by a water-based paint.

In addition, the present invention provides a powder paint composition, and an application method for this composition, wherein, in particular, a vinyl-type copolymer having an epoxy group is used as the above-mentioned multi-functional vinyl-type copolymer (A) which has a functional group which is reactable with carboxylic acid and which has a glass transition temperature of 40° C. or greater.

In addition, the present invention provides a powder paint composition, and an application method for this composition, wherein, in particular, a specific copolymer having an epoxy group as the polymerizable functional group is used as the above mentioned multi-function vinyl-type copolymer (C) which has a functional group which is reactable with carboxylic acid and which has a glass transition temperature of 0° C. or lower.

In addition, the present invention provides an application method for a paint powder composition which uses, as the above-mentioned water-based paint, a substance which contains, as a coat-forming component, a water soluble or water dispersible resin which has as a main component at least one resin selected from the group comprising, in particular, a vinyl-type copolymer resin, a polyurethane resin, a polyurethane urea resin and a polyamide resin, as the above-mentioned water-based paint.

Furthermore, the present invention provides an application method for a paint powder composition which uses, as the above-mentioned water-based paint, a substance which contains at least one kind of particulate resin selected from the group comprising a three dimensionally cross-linked vinyl-type copolymer, a polyurethane resin, a polyurethane urea resin, and a polyamide resin.

BEST MODE FOR CARRYING OUT THE INVENTION

In the following, the present invention will be explained in detail.

The multi-functional vinyl-type copolymer (A) which has a functional group which is reactable with a carboxylic acid, which has a glass transition temperature of 40° C. or greater, and which is an essential component of the powder paint composition of the present invention refers to a vinyl-type copolymer of a form which has two or more so called carboxylic acid reactable functional groups in the one molecule.

As this multi-functional vinyl-type copolymer (A), anything which satisfies the above-mentioned definition can be used, however, in particular, a multi-functional vinyl-type copolymer which has epoxy groups within the molecule is most suitable, and this is known as an epoxy-group-containing multi-functional vinyl-type copolymer and can be obtained by means of copolymerization of a vinyl-type monomer which contains epoxy groups (an epoxy-group-containing vinyl-type monomer) and a vinyl-type monomer which is copolymerizable with this epoxy-group-containing vinyl-type monomer.

Here, particular representative examples of the epoxy-group-containing vinyl-type monomer are glycidyl esters of each type of (meth) acrylic acid such as glycidyl (meth) acrylate and β-methylglycidyl (meth) acrylate, as a start; additionally, there is each type of cycloepoxy-group-containing (meth) acrylic ester such as (meth) acrylic-3,4-epoxycyclohexyl, (meth) acrylic-3,4-epoxy cylcohexylmethyl, and the like; (methyl) glycidylethers of allyl alcohol, (methyl) glycidylethers of methaallyl alcohol; N-glycidylacrylic amide; vinyl sulfonic glycidyl; and the like. These can be used singly or they can of course be used in combinations of two or more.

As specific representative examples only of the other vinyl-type monomer, which is polymerizable with the above-mentioned epoxy-group-containing vinyl-type monomer, (meth) acrylic acid and crotonic acid and their esters; (meth) acrylic esters which contain hydroxyl groups, and the like; and various monomers which contain unsaturated ethylene bonds and which are known as compounds which are copolymerizable with the above-mentioned epoxy-group-containing vinyl-type monomer, and the like can be used. These can be used singly or they can of course be used in combinations of two or more.

As the above-mentioned esters of (meth) acrylic acid, specific representatives examples are, to start with, methyl (meth) acrylate, ethyl (meth) acrylate, n-propyl (meth) acrylate, isoproyl (meth) acrylate, n-butyl (meth) acrylate, isobutyl (meth) acrylate, tert-butyl (meth) acrylate; n-hexyl (meth) acrylate, cyclohexyl (meth) acrylate, 2-ethylhexyl (meth) acrylate, n-octyl (meth) acrylate, isooctyl (meth) acrylate, 2-ethyloctyl (meth) acrylate, dodecyl (meth) acrylate, isodecyl (meth) acrylate, lauryl (meth) acrylate; stearyl (meth) acrylate, benzyl (meth) acrylate, phenyl (meth) acrylate, phenoxyethyl (meth) acrylate; and each type of alkylcarbitol (meth) acrylate such as tetrahydrofurfuryl (meth) acrylate, and ethylcarbitol (meth) acrylate. In addition, there are isobornyl (meth) acrylate, dicyclopentanyl (meth) acrylate, dicyclopentenyl (meth) acrylate, and dicyclopentenyloxyethyl (meth) acrylate.

As particular representative examples only of the (meth) acrylic esters which contain hydroxyl groups, to begin with, there are 2-hydroxyethyl (meth) acrylate, 2-hydroxypropyl (meth) acrylate, 3-hydroxypropyl (meth) acrylate, and 4-hydroxybutyl (meth) acrylate. In addition, there are polyethylene gylcol mono (meth) acrylate, and the like; polypropyleneglycol mono (meth) acrylate, and the like. Additionally, there are so called lactone-denatured hydroxyl-group-containing (meth) acrylates formed by causing any of the above-mentioned hydroxyl-containing (meth) acrylic esters to undergo a ring opening reaction with ε-caprolactone.

In addition to these, for example, all kinds of hydrolyzable silyl-group-containing monomers such as γ-(meth) acryloyloxypropyl trimethoxysilane, γ-(meth) acryloyloxypropyl triethoxysilane, and γ-(meth)acryloyl oxypropylmethyl dimethoxysilane; all types of fluorine-containing α-olefins such as vinyl fluoride, vinylidene fluoride, trifluoroethylene, tetrafluoroethylene, chlorotrifluoroethylene, bromotrifluoroethylene, pentafluoropropylene and hexafluoropropylene; perfluoroalkyl/ perfluorovinyl ether and (per)fluoroalkylvinyl ether (provided that the number of carbons in the alkyl is in the range of 1–18) such as trifluoromethyltrifluorovinyl ether, pentafluroethyltrifluorovinyl ether, and heptafluoropropyltrifluorovinyl ether; and (meth) acrylic monomers having phosphoric ester groups; and the like can be used. However, as representative examples only of the concerned system, there are mono[(meth) acryloyloxyethyl]phosphate, acidic phosphoric (meth) acrylic ester, or (meth) acryloyloxyethylphosphoricphenyl, and the like.

In addition, as specific representative examples only of other ethylenic unsaturated monomers, there are mono- and di-esters of various monomers which contain polycarboxyl groups and monoalkyl esters of 1–18 carbon atoms; all types of aromatic vinyl compounds such as styrene, vinyl toluene, α-methyl styrene, and p-tert-butyl styrene; all types of amide type unsaturated monomers which have an amino group, such as (meth) acrylamide, N-methyl (meth) acrylamide, N-ethyl (meth) acrylamide, N-n-propyl (meth) acrylamide, N-iso-propyl (meth) acrylamide, N-n-butyl (meth) acrylamide, N-iso-butyl (meth) acrylamide, N-tert-butyl (meth) acrylamide, N-amyl (meth) acrylamide, N-(meth) acrylamide, and N-2-ethylhexyl (meth) acrylamide, N,N-dimethyl (meth) acrylamide, N,N-diethyl (meth) acrylamide, N-methylol (meth) acrylamide, N-methoxymethyl (meth) acrylamide, N-ethoxymethyl (meth) acrylamide, N-n-propoxymethyl (meth) acrylamide, N-iso-propoxylmethyl (meth) acrylamide, and N-n-butoxymethyl (meth) acrylamide, or N-iso-butoxymethyl (meth) acrylamide, N-tert-butoxymethyl (meth) acrylamide, N-amyloxymethyl acrylamide, N-octyloxymethyl (meth) acrylamide, N-2-ethyl-hexyloxymethyl (meth) acrylamide, and diacetone (meth) acrylamide; all types of dialkylaminoalkyl (meth) acrylates such as dimethylaminoethyl (meth) acrylate and diethylaminoethyl (meth) acrylate; all types of nitrogen containing monomers such as tert-butylaminoethyl (meth) acrylate, tert-butylaminopropyl (meth) acrylate, aziridinylethyl (meth) arcylate, pyrolidinylethyl (meth) acrylate, piperidinylethyl (meth) acrylate, (meth) acryloylmorphorine, N-vinyl-2-pirrolydone, N-vinylcaprolactam, N-vinyloxazorin, and (meth) acrylonitrile;all types of aliphatic vinyl carboxylates such as vinyl acetate, vinyl propyonate, vinyl butrate, vinyl isobutrate, vinyl caproate, vinyl caprylate, vinyl capricate, vinyl laurylate, $C_9$ branched aliphatic vinyl carboxylates, $C_{10}$ branched aliphatic vinyl carboxylates, $C_{11}$ branched aliphatic vinyl carboxylates, and vinyl stearates; all types of vinyl esters of carboxylic acids which have a ring structure such as cyclohexane vinyl carboxylate, methylcyclohexane vinyl carboxylate, vinyl benzoate, and p-tert-butyl vinyl benzoate; all types alkyl vinylethers such as ethyl vinylether, hydroxyethyl vinylether, hydroxy n-butyl vinylether, hydroxy isobutyl vinylether, cyclohexyl vinylether, and lauryl vinylether; and all types of α-olefins such as all types halogenated olefins other than the above-mentioned fluoro olefins, such as vinyl chloride and vinylidene chloride, or ethylene, propylene and butene-1.

The above-mentioned multi-functional vinyl-type copolymer (A) can be prepared by means of any known and used methods and, when doing so, any of the known and used compounds can be used as the radical polymerization initiator.

From among these, as specific representative examples, there are azo-compound such as 2,2'-azobis isobutylonitrile, 2,2'-azobis-methylonitrile, 2,2'-azobis-2,4-dimethylvalerolonitrile, 1,1'-azobis-cyclohexane carbonitrile, dimethyl-2,2'-azobis isobutylate, 4,4'-azobis-4-cyanovaleric acid, 2,2'-azobis-(amidinopropene) diacid chloride, 2-tert-butylazo-2-cyanopropane, 2,2'-azobis(2-methyl-propionic amide) dihydrate, and 2,2'-azobis(2,2,4-trimethylpentane) 2,2'-azobis(2-(2-imidezoline-2-il) propane); and all types of peroxides such as benzoylperoxide, methylethylketoneperoxide, cumenehydroperoxide, potassium persulfate, tert-butylperoxyneodecanoate, tert-butylperoxypivalate, tert-butylperoxy-2-ethylhexanoate, tert-butylperoxyisobutylate, 1,1-bis-tert-butylperoxy-3,3,5-trimethylcyclohexane, and tert-butylperoxy-laurate, tert-butylperoxyisophthalate, tert-butylperoxyacetate, tert-butylyperoxybenzoate, dicumyl peroxide and di-tert-butyl peroxide;these are ketoneperoxide; peroxyketals; hydroperoxides; dialkylperoxides; diacylperoxides; peroxyesters; peroxycarbonates; or hydrogen peroxide; or the like.

In addition, in accordance with need, chain transfer agents can be used, and within these, and as particular representative examples only, there are dodecylmercaptan, laurylmercaptan, thioglycolic ester, mercaptoethanol, and α-methyl styrene dimer, and the like.

As the amount of epoxy-containing vinyl-type monomer used in the above-mentioned multi-functional vinyl-type copolymer (A), and, in particularly, in the epoxy-containing multi-functional vinyl copolymer (A), an amount in the range of from approximately 5% by weight to approximately 80% by weight of the total amount of vinyl-type monomer to be used is suitable, within the range of 30–60% by weight is preferable, and within a range of 40–60% is even more preferable.

When the amount of this epoxy-group-containing vinyl-type monomer is less than approximately 5% by weight, the mechanical properties and the like of the obtained paint coating are easily degraded, and as a result, the effects of the present invention can not be sufficiently realized. On the other hand, when the amount used exceeds approximately 80% by weight by too great an amount, the appearance and the like of the paint coating is reduced and, as a result, the effects of the present invention cannot be realized. Therefore, neither of these situations is preferable.

In addition, as the numerical average molecular weight of the above-mentioned multi-functional vinyl-type copolymer (A) which has a functional group which is reactable with carboxylic acid and, in particular, of the epoxy-group-containing multi-functional vinyl-type copolymer (A), a value in the range of from approximately 1,000 to approximately 10,000 is suitable and, in addition, a value in the range of 1,500 to 8,000 is even more suitable.

When this numerical average molecular weight is less than approximately 1000, the mechanical properties of the paint film readily become inferior. On the other hand when this numerical average molecular weight exceeds approximately 10,000 by too great an amount, the smoothness and the like of the paint coating become easily degraded. Therefore, neither of these situations are desirable.

In addition, even among the above-mentioned multi-functional vinyl-type copolymers (A), when the glass transition temperature is less than 40° C., from the standpoint of the suitability of the powder paint for application and, in addition, from the standpoint of the stability, etc., of the paint itself, defects are easily formed. Therefore, this situation is undesirable.

Furthermore, as the softening point based on the ring and ball method for the above-mentioned copolymer (A), a value within the range of approximately 80° C. to approximately 150° C. is suitable. When this is less than approximately 80° C., the anti-blocking properties and the like of the powder paint become easily degraded. On the other hand, when this is greater than approximately 150° C., the smoothness, and the like, of the paint coating become easily degraded. Therefore, neither situation is desirable.

In order to obtain the above-mentioned multi-functional vinyl-type copolymer (A) which has functional groups which can react with carboxylic acid and which has a glass transition temperature of 40° C. or more, and, in particular, to obtain an epoxy-group-containing multi-functional vinyl-type copolymer (A), from various vinyl-type monomers such as those set out above, various known and used methods can be suitably used, however, since a solution radical polymerization method is very simple, it is particularly recommended.

Next, as the above-mentioned polycarboxylic acid (B), in the main, aliphatic or aromatic polycarboxylic acids can be used; however, from among these, as specific representative examples only, there are succinic acid, glutaric acid, adipic acid, pimelic acid, suberic acid, azelaic acid, sebatic/sebacic acid, burashilic acid, 1,12-dodecanoic di acid, 1,20-eikoic di acid, 1,24-tetraeikoic di acid, maleic acid, citraconic acid, itaconic acid, and glutaconic acid, as a start; in addition, there are phthalic acid, isophthalic acid, trimellitic acid, pyromellitic acid, tetrahydroxphthalic acid, hexahydrophthalic acid and cyclohexane-1,2-dicarboxylic acid, or their acid anhydrides. From among these, in particular, 1,12-dodecanic di acid and 1,20-eikonic di acid can be suitably used.

As the proportion of the above-mentioned multi-functional vinyl-type copolymer which contains functional groups which can react with carboxylic acid (A) and, in particular, of the epoxy-group-containing multi-functional vinyl-type copolymer (A), to the above polycarboxylic acid (B), a ratio within a range that will achieve an equivalent ratio for the reactable function reactable functional groups, in other words, the epoxy groups, within the former copolymer (A) and the carboxyl groups within the later polycarboxylic acid (B) within a range for (A)/(B) of approximately 0.5 to approximately 1.5 (which is suitable) is preferable.

The above-mentioned multi-functional vinyl-type copolymer (C) which has functional groups which are reactable with carboxylic acid and which has a glass transition temperature of 0° C. or less, and, in particular, the multi-functional vinyl copolymer (C) which has epoxy groups and which has a glass transition temperature of 0° C. or less, can be obtained by means of using the same manufacturing method as for the above-mentioned multi-functional vinyl-type copolymer (A) which has functional groups which are reactable with carboxylic acid, in other words, the epoxy-group-containing multi-functional vinyl-type copolymer (A).

In more detail, in the manufacture of this vinyl copolymer (C), it is possible to use, unmodified, the above-mentioned epoxy-containing vinyl-type monomers, the other vinyl-type monomers, the radical polymerization initiators, and the chain transfer agents which are used when preparing vinyl-type copolymers (A) which contain functional groups which are reactable with carboxylic acid and, in particularly, the epoxy-group-containing vinyl-type copolymer (A).

When the amount of this epoxy-group-containing vinyl-type monomer is less than approximately 5% by weight, the mechanical properties of the obtained paint coating become easily degraded, as a result, the effects of the present invention can not be realized, therefore, this is not desirable.

In addition, as the numerical average molecular weight of this multi-functional vinyl-type copolymer (C), and in particular, of the epoxy-group-containing multi-functional vinyl-type copolymer (C), a value within the range of from approximately 1,000 to approximately 20,000 is suitable, and a value within the range of from 2,000 to 15,000 is even more preferable.

When this numerical average molecular weight is less than approximately 1,000, the mechanical properties of the paint coating and the like easily become inferior. On the other hand, when this numerical average molecular weight is greater than approximately 20,000, the smoothness of the paint coating becomes easily degraded. Therefore, neither situation is desirable.

As the amount of the above-mentioned multi-functional vinyl-type copolymer (C) added, and, in particular, as the amount of the epoxy-group-containing multi-functional vinyl-type copolymer (C) added, an amount within the range of approximately 0.1 to approximately 10% by weight, with regard to the composition which contains component (A) and component (B) as essential coating forming components, is suitable, and an amount within the range of 0.2 to 5% by weight is preferable, and an amount within the range of 0.5 to 4% by weight is even more preferable.

When the amount added is less than approximately 0.1% by weight, it is difficult to achieve the results which are the objects of the present invention. On the other hand, when the amount added exceeds approximately 10% by weight by too great an amount, from the standpoint of the suitability of the powder paint for application and, in addition, from the standpoint of the stability, etc., of the paint itself, defects are easily formed. Therefore, this situation is undesirable.

The compound (D) which is another essential component of the powder paint composition of the present invention and which contains a specific organic group refers to a compound which has at least one organic group per molecule which is represented by either of the following general formula [I-1] or [I-2]; and this can be a low molecular weight compound or it can be a high molecular weight compound.

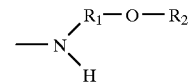
[I-1]

In the formula, R1 represents a group comprising —CH$_2$— or —CH$_2$CH$_2$— and R2 represents a hydrogen atom or an alkyl group of 1–12 carbons.

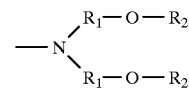
[I-2]

In the formula, R1 represents a group comprising —CH$_2$— or —CH$_2$CH$_2$— and R2 represents a hydrogen atom or an alkyl group of 1–12 carbons.

From among these compounds, as particular representative examples only, there are condensates having a form obtained by means of reacting any type of amino-containing compound, such as melamine, urea, acetoguanamine, benzoguanamine, steroguanamine and spiroguanomine, with any kind of aldehyde type compound component by means of various known and practiced methods, or there are aminoplasts obtained by etherization these any of these condensates with alcohol.

As specific examples of these aminoplasts, for example, hexamethoxymethylmelamine, hexabutyl etherified methylolmelamine, methylbutyl mixture etherified methylolmelamine, methyl etherified methylolmelamine, n-butyl etherified methylolmelamine, and isobutyl etherified methylolmelamine; or their condensates can be mentioned.

Furthermore, in addition to these, for example, various acid amides obtained by means of condensation reactions of various double ringed compounds and aliphatic dibasic acids, with various alkanolamines, such as diethanolamine and the like,such as hexamethoxyglycoluril and hexabutoxyglycoluril can be used. In addition, it is also possible to use various high molecular weight compounds and the like which are obtained by means of conducting a polymerization reaction on any type of polymerizable monomer such as the butylether of N-methylolacrylamide, or by conducting a copolymerization reaction with other monomers which are copolymerizable.

As specific representative examples only of the n-butylated melamine resin, there are "Super Beckamine L-164" (the product name of a high non-volatile type resin manufactured by Dainippon Ink Chemical Industries Ltd.) and the like. As specific representative examples only of the hexamethoxymethylated melamine, there is "Cymel 300, 301, or 303" (product name, manufactured by Mitsui Cyanamid". As representative examples only of those which are in a form which has been denatured by two or more alcohols, there is "Cymel 238, 232, and 266" (manufactured by Mitsui Cyanamid") and the like.

As specific representative examples only of the glycoluril resin, there are "Powderlink 1174" (the product name of an aminoplast which has tetramethoxymethylglycoluril as a main component and which is manufactured by American Cyanamid of the United States of America) which is shown by the following structural formula. In addition, as specific representative examples only of the acid amides there is "Primid XL-552" (the product name of a acid amide compound manufactured by Rohm And Haas Co. of the United States of America.

In more detail, "Powderlink 1174" is represented by a structural formula like the following.

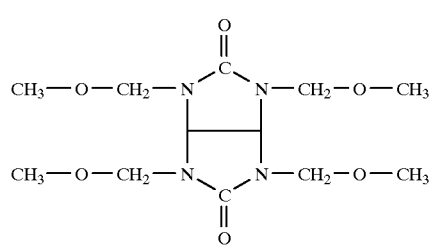

(II)

In addition, "Primid XL-552" is represented by a structural formula like the following.

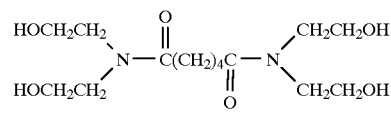

(III)

As the amount of the above-mentioned compound (D) added, an amount in the range of approximately 0.5 to approximately 50% by weight with regard to a resin composition which contains component (A), component (B), and component (C) as essential coating forming components is suitable, and an amount within the range of 0.5 to 30% by weight is preferable, and an amount within the range of 1 to 20% by weight is even more preferable.

When this amount is less than 0.1% by weight, it is difficult to realize the effects which are the object of the present invention. On the other hand, when this amount exceeds approximately 50% by weight by too great an amount, from the standpoint of the suitability of the powder paint for application and, in addition, from the standpoint of the stability, etc., of the paint itself, defects are easily formed. Therefore, this situation is undesirable.

When this compound (D) is additionally used, for the purpose of promoting the hardening of this compound (D), an acid catalyst can of course be used.

As specific representative examples of this type of acid catalyst, there are phosphoric acid; formic acid; succinic acid (anhydrous); oxalic acid; methane sulfonic acid; each type of alcoxynaphthalene sulfonic acid such as p-toluene sulfonic acid, dodecyl benzene sulfonic acid, and dinonyl naphthaline sulfonic acid, and dinonylnaphthalenedisulfonic acid, and the like; their alkaline metal salts; alkaline earth metal salts, or amino salts; or the like.

Various know paint additives and the like of categories which are generally used in this type of powder paint composition, such as all types of synthetic resins and the like, such as epoxy compounds or epoxy resins, polyester resin, urethane resin, and polyamide resin, to start with; hardening catalysts for reactions of oxygen (groups) and epoxy (groups); fluidity adjusting agents; anti-blocking agents; ultraviolet ray absorbing agents; light stabilizing agents; benzoin; anti-static agents; oxidation inhibitors; and the like, can be added to the powder paint composition of the present invention which is obtained in the above-mentioned way. This paint composition used in the present invention can be practically used as a paint which contains these types of additives or as a paint which does not contain these additives.

From among these additives, firstly, as specific representative examples of the ultra violet ray absorbing agents, the light stabilizing agents, or the oxidation inhibiting agents, there are all types of benzophenones, such as 2,4-dihydroxybenzophenone ("Seasorb 100"), 2,2', 4,4'-tetrohydroxybensophenone, 2-hydroxy-4-methoxybenzophenon ("Seasorb 101"), 2,2'-dihydroxy-4,4'-methoxybenzophenone, and 2-hydroxy-4-methoxy-5-sulfobenzophenone; all types of benzotriazoles, such as 2-(3,5-di-tert-amyl-2-hydroxyphenyl)benzotriazole ("Tinuvin 328"), 2-(2-hydroxy-5'methy-phenyl) benxotriazole ("Tinuvin P"), 2-[2-hydroxy-3,5-di(1,1-dimethylbenzyl)phenyl]-2 H benzotrialzole ("Tinuvin 900"); all types of salicylates, such as phenylsalicylate (Seasorb 201); all types of substituent acrylonitryls such as ethyl-2-cyano-3,3'-diphenylacrylate ("Seasorb 501"); all types of anilinium oxalates, such as 2-ethoxy-2'-ethyloxyaku acid bisanilide ("312"); all types of nickel complexes, such as [2,2'-theobis(4-tert-octylphenolate)]-2-ethylhexylamine-nickel (II) ("seasorb 612NH"); all types of hindered amines, such as bis(1,2,2,6,6-pentamethyl-4-piperidyl) sebacate (292""), bis(2,2,6,6-tetramethyl-4-piperidyl)sebacate ("770"), 2-(3,5-di-tert-butyl-4-hydroxybenzyl)-2-n-butylmalonic bis (1,2, 2,6,-pentamethyl-4-piperidyl) ("144"); and all types of phenols, such as 3,4-di-tert-buthyl-4-hydroxytoluen ("BHT Swanox"), tetrakis -[methylene-(3,5 di-tert-butyl-4-hydroxyhydrocynnamate)] ("Irganox 1010").

As specific representative examples of the catalyst for reaction between carboxylic acid and epoxy group, there are phosphines such as triphenylphosphine; imidazoles such as 2-methylimidazole; and ammonium salts such as tetrabutylammoniumchloride.

The above-mentioned water-based paint refers to a paint which is dilutable with water; which has a form containing water as an essential solvent; and for which the binder which is the main component of this water-based paint is a water soluble resin or a water dispersible resin selected from the group comprising vinyl-type copolymer, cross-linked vinyl-type copolymer, polyurethane resin, cross-linked polyurethane resin, polyurethane polyurea resin, cross-linked polyurethane polyurea resin, and polyamide resin, in the main.

Here, water dispersible resin is a general term for emulsion polymers, dispersion type and suspension type.

In addition, in accordance with need, cellulose derivatives of types like nitrocellulose, cellulose acetate, or cellulose acetate butylate; polyvinyl chloride, polyvinyl acetate, vinyl chloride-vinyl acetate copolymer, ethylene-vinyl acetate copolymer, vinyl chloride-vinyl acetate-vinyl alcohol copolymer, vinyl chloride-vinylidene chloride copolymer, vinyl chloride-acrylonitrile copolymer, polybutadiene, acrylonitrile-butadiene copolymer, acrylonitrile-butadiene-styrene copolymer, chlorinated rubber, cyclized rubber, polyvinylbutyral, polyvinyl alcohol and the like, to begin with; all types of halogenated polyolefins such as chlorinated polyethylene, chlorinated polypropylene, polyethylene, polypropylene, polyvinylidiene fluoride, polypropylene chloride, and amino resin; all types of hardening agents such as polyisocyanate and block polyisocyante; and additionally water-based forms made by denaturing these compounds can be used together with the above-mentioned water-based paint.

In addition, one or two or more of the various know paint additives of the type which are generally used in water-based paints, such as pigments, organic and inorganic fillers, ultra-violet absorbing agents, light stabilizing agents, oxidation inhibitors, anti-static agents, thickening agents, anti-foaming agents, leveling agents, preservatives, film forming agents, and the like can be added in accordance with need.

Here, as examples of the ultra-violet absorbing agent, the light stabilizing agent, and the oxidation inhibiting agent, any of the above-mentioned compounds can be used without modification.

In addition, as examples of the pigment, and the organic and inorganic fillers, various know and used substances can be used: however, from among these, as specific representative examples, there are all types of insoluble azo pigments, such as Bentydiene Yellow, Hanza Yellow, Lake Red 4R; soluble azo pigments such as Lake Red C, Carmin 6B and Bordeaux 10; all types of copper phthalocyanine type pigments, such as phthalocyanine blue and phthalocyanine green; all types of chlorine dyeing lakes, such as rhodamine lake and methylviolet lake; mordant dye-type pigments such as quinoline lake and fast sky blue; and all types of vat dye type pigments, such as anthraquinones, theoindigos and perinones; all types of kinacrydone type pigments such as Cyncasia Red B; all types of dioxadine type pigments, such as dioxadine violet; all types of condensation azo pigments such as chromophthal, and the like, to start with, and in addition, there is aniline black, and the like.

As inorganic fillers, there are pearl pigments and metallic pigments classified as: all types of chromates such as zinc chromate, and molibdate orange; all types of ferrocyanide compounds such as deep blue; all types of metal oxides such as iron oxide, red iron oxide and green chromium oxide; all types of sulfides such as cadmium yellow, cadmium red and mercury sulfite; selinides; all types of sulfates such as barium sulfate and lead sulfate; all types of silicates such as calcium silicate and ultramarine; all types of carbonates such as calcium carbonate and magnesium carbonate, all types of phosphates such as cobalt violet and manganese purple; all types of metallic powder pigments such as aluminum powder, gold powder, silver powder, copper powder, bronze powder, and brass powder; or their metal flake pigments; mica flake pigment; mica flake pigments which have been coated with metallic oxides; mica shape oxide pigments, and the like.

In addition, as constituent pigments, there are barium sulfate precipitate, Chinese white (zinc oxide), plaster, white alumina, clay, silica, white silica, talc, magnesium carbonate precipitate, and kaolin; additionally, carbon black and the like can also be used in their various pigment forms.

Of course the above-mentioned water-based paints can be in a ambient dry form or in a thermosetting form.

In addition, the powder paint composition of the present invention can be applied to the surface of a dry coating of the above-mentioned water-based paint by means of a "wet on wet" method, in other words, the powder paint can be applied using a "two coat one bake" system or a "two coat two bake" system, and it can have the form of a multi-layer paint coating formation method (multi-layer application method) or a laminated paint coating formation method (lamination application method).

The powder paint composition of the present invention can be manufactured by means of any of known and used method; however, usually, a method is used in which the desired powder paint is manufactured, as a pigment containing paint or as a clear paint which does not have any pigments, by means of mixing all of the above-mentioned components, then fusion mixing them sufficiently at a temperature of approximately 80° to approximately 130° C. by means of a fusion kneader such as a heating roller or an extruder, then, after being cooled, the product is pulverized.

In addition, with regard to the method of application, a paint coating substrate is coated by means of various known and used methods such as a static spraying method or fluid immersion; then the thus obtained paint coating can be glazed in an glazing oven at a temperature of approximately 150° C. to approximately 210° C., and in this way, a it is possible to obtain a paint coating using powder paint.

Here, as representative examples only of the above-mentioned paint coating substrate, there are all types of metallic materials and metallic products, such as steel, aluminum, stainless steel, chrome plating, zinc sheet, and tin plate; tiles; glass; all types of inorganic building materials and the like; and more specifically; there are automobile bodies and automobile parts, and two-wheeled vehicles and two-wheeled vehicle parts, to begin with. There are also all types of building materials such as gates and fences; all types of internal and external construction materials such as aluminum sashes; and all types of products and all types of materials of various ferrous and non-ferrous metals such as aluminum foil.

The powder paint composition of the present invention gives a paint film which is, in particular, superior in mar resistance, and for which the appearance, for example, smoothness and sharpness, is also excellent. In addition, when this powder paint composition is applied to the top of a base-coat applied using a water paint, a paint coating is obtained which is highly practicable, and which has a balance of characteristics like no paint defects like surface roughness and orange peel, and superior scratch resistance.

EMBODIMENTS

In the following, the present invention is explained in more detail using synthesis examples, reference examples, embodiments and comparative examples; however, these are only applied embodiments of the present invention, and the present invention is definitely not limited by these examples. Moreover, in the following, the expressions "parts" and "%" are a weight standard except where stated otherwise.

SYNTHESIS EXAMPLE

Manufacture of Epoxy-group-containing Vinyl-type Copolymer A 100 parts of xylene were put into a reaction vessel equipped with a thermometer, a stirrer, a reflux condenser, and a nitrogen introduction inlet, and the temperature raised to 130° C.

To this, a mixture comprising 30 parts of glycidylmethacrylate, 25 parts of n-butylmethacrylate, 30 parts of methylmethacrylate, and 15 parts of styrene, as monomers, together with 4 parts of tert-butylperoxy2-ethylhexanoate, as a polymerization initiator, was dripped in over 5 hours.

After the dripping was completed, the polymerization reaction was allowed to continued while being maintained at the same temperature for an additional 10 hours, and thereby the reaction was completed.

After the polymerization reaction was completed, by means of removing the xylene by maintaining the obtained resin solution under low pressure of approximately 30 Torr, a solid epoxy-group-containing vinyl-type copolymer (A-1) was obtained having a non-volatile portion of 99.5%, a softening point of 105° C. according to a ring and ball method, a numerical average molecular weight of 3,100, and a glass transition temperature of 61° C.

SYNTHESIS EXAMPLES 2–4

(Manufacture of Epoxy-group-containing Vinyl-type Copolymer (A))

As shown in Table 1, with the exception of changes to the respective mixtures comprising the monomers and polymerization initiators, each of the desired copolymers was obtained in the same way as in Synthesis Example 1, by dripping in the mixture over a period of 5 hours, then, when the dripping was completed, the polymerization reaction was completed by allowing it to continue for 10 hours while maintaining it at the same temperature; and then the solvents were removed.

TABLE 1

| | | epoxy-group-containing multi-functional vinyl copolymer (A) | | |
|---|---|---|---|---|
| | | A-2 | A-3 | A-4 |
| monomers which make up this copolymer which contains epoxy groups (parts by weight) | glycidyl methacrylate | 40 | 50 | 60 |
| | styrene | 15 | 15 | 15 |
| | methyl methacrylate | 25 | 22 | 10 |
| | n-butyl methacrylate | 20 | 13 | 15 |
| polymerization initiator (parts by weight) | tert-butyl peroxy 2-ethyl-hexanoate | 4 | 4 | 3 |
| glass transition temperature | ° C. | 60 | 61 | 54 |
| numerical average molecular weight | | 3,200 | 3,300 | 4,500 |

SYNTHESIS EXAMPLES

Manufacture of Epoxy-group-containing Vinyl-type Copolymer (C)

100 parts of xylene were charged into a reaction vessel equipped with a thermometer, a stirrer, a reflux condenser, and a nitrogen introduction inlet, and the temperature raised to 120° C.

To this, as shown in Table 2, a mixture comprising monomers and a polymerization initiator, was dripped in over 4 hours. After the dripping was completed, the polymerization reaction was allowed to continued while being maintained at the same temperature for an additional 10 hours, and thereby the reaction was completed.

After the polymerization reaction was completed, the xylene was removed by maintaining the obtained resin solution under low pressure of approximately 30 Torr, and thereby various desired copolymers (C) were obtained having a non-volatile portion of 99% or greater. The values for the composition of each of these copolymers (C) are displayed together in Table 2.

TABLE 2

| | | No. 1 | | |
|---|---|---|---|---|
| | | epoxy-group-containing multi-functional vinyl copolymer (C) | | |
| | | C-1 | C-2 | C-3 |
| monomers which make up this copolymer which contains epoxy groups (parts by weight) | glycidyl methacrylate | 44 | 15 | |
| | cyclomer M-100 | | | 50 |
| | 2-ethyl-hexyl acrylate | 56 | 85 | 50 |
| polymerization initiator (parts by weight) | tert-butyl peroxy 2-ethyl-hexanoate | 0.5 | 0.3 | 0.2 |

TABLE 2

| | | epoxy-group-containing multi-functional vinyl copolymer (C) | | |
|---|---|---|---|---|
| | | C-1 | C-2 | C-3 |
| glass transition temperature | °C. | −31 | −58 | −15 |
| numerical average molecular weight | | 7,100 | 8,200 | 9,100 |

REFERENCE EXAMPLE 1

A Manufacture Example for a Water Soluble Resin for use in the Multi-Layer Coating Forming Method of the Present Invention In advance, a liquid mixture is prepared which comprises 250 parts of styrene, 157 parts of methacrylic acid, 63 parts of 2-hydroxyethylmethacrylate, and 30 parts of methacrylate, together with 8 parts of tert-butylperoxyoctate (abbreviated as TBPO).

Next, 75 parts of this liquid mixture and 500 parts of methylethylketone (MEK) were put into a reaction vessel equipped with a thermometer, a stirrer, a flux condenser, and a nitrogen introduction inlet, and while mixing under a nitrogen seal, it was maintained at 75° C. for 30 minutes, and then the remainder of the liquid mixture was dripped in over a 2 hours.

Furthermore, the reaction was continued for 12 hours at the same temperature and, thereby, an acrylic resin solution was obtained which had a non-volatile component of 50%, a solution acid value of 20, a solution base number of 25, and a Gardner Viscosity of at 25° C. of Z (the same hereinafter).

Next, after adding 31 parts of dimethylaminoethanol to 1000 parts of this acrylic resin solution, water was added, and a 55% concentration of a water soluble acrylic resin solution was obtained. Hereinafter, this will be referred to as water soluble resin (E-1).

REFERENCE EXAMPLE 2

A Manufacturing Example For a Water Soluble Resin Used in the Multi-Layer Coating Forming Method of the Present Invention 680 parts of deionized water, 2 parts of ammonium persulfate and 15 parts of "Triton X-200" (See "Note" below) were added to a reaction vessel the same as used in Reference Example 1, and heated to 95° C.

Next, an aqueous emulsified solution of an acrylic monomer component (acrylic monomer) (explained below) was dripped in to this 95° C. reaction system over a 4 hour period, and when the dripping was completed it was maintained for a further 3 hours.

Next, the reaction solution was cooled and 5 parts of dimethylethanolamine and 40 parts of deionized water were added. In this way, a milk-white colored dispersion solution of a stable water-dispersed acrylic resin having a solid component of 45%. Hereinafter, this is referred to as water dispersible resin (E-2).

| | |
|---|---|
| Styrene | 150 parts |
| methylmethacrylate | 300 parts |
| ethylacrylate | 380 parts |
| 2-hydroxyethylmethacrylate | 150 parts |
| acrylic acid | 20 parts |
| n-octylmercaptan | 5 parts |
| ammonium persulfate | 4 parts |
| "Triton X-200" (1) | 15 parts |
| "Emulgen 840s" (2) | 10 parts |
| deionized water | 530 parts |

Note (1):
Product name of an anionic type surfactant manufactured by Rohm & Haas of the United States of America.
(2):
Product name of an non-ionic type surfactant manufactured by Kao (Ltd)

REFERENCE SAMPLE 3 (same as above)

With the exception of the changes to the acrylic monomer component to be used as indicated below, a milk-white stable dispersion solution of a water dispersed acrylic resin which contains cross-linkable particles which are not soluble in the solvent and a solid component of 45% is obtained in the same way as in Reference Example 2. Hereinafter, this is referred to as water dispersible resin (E-3).

| | |
|---|---|
| methylmethacrylate | 450 parts |
| ethylacrylate | 350 parts |
| 2-hydroxyethylmethacrylate | 150 parts |
| acrylic acid | 20 parts |
| ethyleneglycoldimethacrylate | 30 parts |
| ammonium persulfate | 4 parts |
| n-octylmercaptan | 5 parts |
| "Triton X-200" (1) | 15 parts |
| "Emulgen 840s" (2) | 10 parts |
| deionized water | 530 parts |

REFERENCE EXAMPLES 4–18

A Manufacturing Examples for a Powder Paint Composition of the Present Invention and A Manufacturing Example of a Powder Paint Composition for the Purpose of Comparison and Contrast Each of the components was mixed in the mixing proportions shown in Table 3, in addition, the resulting mixture was heating kneaded by means of a "Ko-kneader" (the product name of a single axis kneader, "Model PR-46" manufactured by a Bus Co. of Switzerland).

Next, each of the thus obtained kneaded products were coarsely crushed, and additionally finely crushed and, thereby, various desired powder paints having an average particle size of 30–40 μm were obtained. Hereinafter, these are referred to as powder paints T-1 to T-12 and they are powder paint compositions according to the present invention in their respective order. In addition, the powder paints for use as comparison and contrast, and which are completely without the use of both of component (C) and component (D), are referred to as T-13 to T-15, and they are shown in the same Table.

TABLE 3

No. 1

|  |  | T-1 | T-2 | T-3 |
|---|---|---|---|---|
| epoxy-group-containing copolymer (A-1) |  | 80 | 80 |  |
| epoxy-group-containing copolymer (A-2) |  |  |  | 77 |
| 1,12-dodecane di acid (B) |  | 20 | 20 | 23 |
| epoxy group | C-1 | 2 |  |  |
| containing | C-2 |  | 2 |  |
| copolymer (C) | C-3 |  |  | 2 |
| silicon type leveling agent |  | 0.2 | 0.2 | 0.2 |

Footnotes for Table 3
"Cymel 327" is the product name for a methylated malamine which contains imino groups and it is manufactured by Mitsui Cyamide Co.

TABLE 3

No. 2

|  |  | T-4 | T-5 | T-6 |
|---|---|---|---|---|
| epoxy-group-containing copolymer (A-2) |  | 77 |  |  |
| epoxy-group-containing copolymer (A-4) |  |  | 70 | 70 |
| 1,12-dodecane di acid (B) |  | 23 | 30 | 30 |
| epoxy group | C-1 | 2 |  |  |
| containing | C-2 |  | 2 |  |
| copolymer (C) | C-3 |  |  | 2 |
| silicon type leveling agent |  | 0.2 | 0.2 | 0.2 |

TABLE 3

No. 3

|  |  | T-7 | T-8 | T-9 |
|---|---|---|---|---|
| epoxy-group-containing copolymer (A-3) |  | 74 | 74 | 74 |
| 1,12-dodecane di acid (B) |  | 26 | 26 | 26 |
| epoxy group | C-1 | 2 |  |  |
| containing | C-2 |  | 2 |  |
| copolymer (C) | C-3 |  |  | 2 |
| silicon type leveling agent |  | 0.2 | 0.2 | 0.2 |

TABLE 3

No. 4

|  |  | T-10 | T-11 | T-12 |
|---|---|---|---|---|
| epoxy-group-containing copolymer (A-3) |  | 74 | 74 | 74 |
| 1,12-dodecane di acid (B) |  | 26 | 26 | 26 |
| epoxy group | C-1 | 1 | 1 | 1 |
| containing | C-2 |  |  |  |
| copolymer (C) | C-3 |  |  |  |
| Compound | "Cymel 327" | 3 |  |  |
| (D) | Powderlink 1174 |  | 5 |  |
|  | Primid XL-552 |  |  | 3 |
| acid catalyst | p-toluen sulfonic acid | 0.2 | 0.2 |  |
| "mondaflow resin" (Note 1) |  |  |  |  |
| silicon type leveling agent |  | 0.2 | 0.2 | 0.2 |

TABLE 3

No. 5

|  | T-13 | T-14 | T-15 |
|---|---|---|---|
| epoxy-group-containing copolymer (A-1) | 80 |  |  |
| epoxy-group-containing copolymer (A-3) |  | 74 | 74 |
| 1,12-dodecane di acid (B) | 20 | 26 | 26 |
| "mondaflow resin" (Note 1) |  |  | 0.5 |
| silicon type leveling agent | 0.2 | 0.2 | 0.2 |

REFERENCE EXAMPLE 19

(Manufacturing Example for Thickening Agent)

6 parts of dimethylethanolamine and deionized water were added to 64 parts of "Acryzol ASE-60" (the product name of a thickening agent, which has a solid portion of 28%, manufactured by Rohm and Haas) with the goal of obtaining a thickening agent with a solid component of 3%. Hereinafter, this is referred to as (P).

REFERENCE EXAMPLE 20

Manufacturing Example for a Water-based Base-coat Paint (1)

100 parts of water soluble resin (E-1) obtained in Reference Example 1, 10 parts of thickening agent (P) obtained in Reference Example 19, 6 parts of "Cymel 300" (mentioned above), 1 part of p-toluene sulfonic acid, 3 parts of "Alumipaste dispersion liquid #4919" (the product name of an alumipaste manufactured by Toyo Aluminum Ltd.), 1.5 parts of "Alumipaste dispersion liquid #55-519" (manufacture by the same company) and 12 parts of isopropanol were mixed and then the viscosity was adjusted for 16 seconds by means of a Ford Cup No. 4 at 20° C. using deionized water. Hereinafter, this is referred to as water-based base-coat paint (X-1).

REFERENCE EXAMPLE 21

Manufacturing Example for a Water-based Base-coat Paint (2)

100 parts of water dispersible resin (E-2) obtained in Reference Example 2, 10 parts of thickening agent (P) obtained in Reference Example 19, 5 parts of "Cymel 300", 1.0 part of p-toluene sulfonic acid, 3 parts of "Alumipaste dispersion liquid #4919", 1.5 parts of "Alumipaste dispersion liquid #55-519", and 12 parts of isopropanol were mixed and then the viscosity was adjusted for 16 seconds by means of a Ford Cup No. 4 at 20° C. using deionized water. Hereinafter, this is referred to as water-based base-coat paint (X-2).

REFERENCE EXAMPLE 22

Manufacturing Example for a Water-based Base-coat Paint (3)

100 parts of water dispersible resin (E-3) obtained in Reference Example 3, 10 parts of thickening agent (P) obtained in Reference Example 19, 5 parts of "Cymel 300", 1.0 part of p-toluene sulfonic acid, 3 parts of "Alumipaste dispersion liquid #4919", 1.5 parts of "Alumipaste dispersion liquid #55-519", and 12 parts of isopropanol were mixed and then the viscosity was adjusted for 16 seconds by means of a Ford Cup No. 4 at 20° C. using deionized water. Hereinafter, this is referred to as water-based base-coat paint (X-3).

Embodiments 1–12

For all of these examples, the respective powder paints (T-1) to (T-12) obtained in Reference Examples 4–15 were applied to a 0.8 mm thick zinc phosphatizinged dull steel plate, using a powder paint static spray painter, next, glazing was conducted under the conditions shown in Table 4 and, thereby, various test pieces formed into hardened paint coats were obtained. The results of the evaluation of these test pieces is shown together in the same table.

COMPARATIVE EXAMPLES 1–3

With the exception of changes made for using powder paints (T-13) to (T-15) for comparison and contrast, these were prepared in the same way as Embodiments 1–12, and the evaluation results shown in Table 4 were obtained.

TABLE 4

No. 1

| Name of Powder Paint | T-1 | T-2 | T-3 |
|---|---|---|---|
| Curing Conditions (° C./20 mins) | 160 | 160 | 150 |
| Coating Thickness (μm) | 79 | 75 | 78 |
| Smoothness of Paint Coating Visual Evaluation | Good | Good | Good |
| Gloss Sharpness gloss at 60° | 91 | 94 | 92 |
| Mar Resistance | 75 | 76 | 85 |
| 20° Gloss Retention (%) | | | |
| Adherence | Excellent | Excellent | Excellent |
| Recoatability | Excellent | Excellent | Excellent |

TABLE 4

No. 2

| Name of Powder Paint | T-4 | T-5 | T-6 |
|---|---|---|---|
| Curing Conditions (° C./20 mins) | 150 | 140 | 140 |
| Coating Thickness (μm) | 79 | 75 | 78 |
| Smoothness of Paint Coating Visual Evaluation | Good | Good | Good |
| Gloss Sharpness gloss at 60° | 92 | 93 | 91 |
| Mar Resistance | 88 | 86 | 91 |
| 20° Gloss Retention (%) | | | |
| Adherence | Excellent | Excellent | Excellent |
| Recoatability | Excellent | Excellent | Excellent |

TABLE 4

No. 3

| Name of Powder Paint | T-7 | T-8 | T-9 |
|---|---|---|---|
| Curing Conditions (° C./20 mins) | 140 | 140 | 140 |
| Coating Thickness (μm) | 70 | 68 | 73 |
| Smoothness of Paint Coating Visual Evaluation | Good | Good | Good |
| Gloss Sharpness gloss at 60° | 92 | 91 | 92 |
| Mar Resistance | 84 | 86 | 89 |
| 20° Gloss Retention (%) | | | |
| Adherence | Excellent | Excellent | Excellent |
| Recoatability | Excellent | Excellent | Excellent |

TABLE 4

No. 4

| Name of Powder Paint | T-10 | T-11 | T-12 |
|---|---|---|---|
| Curing Conditions (° C./20 mins) | 150 | 150 | 150 |
| Coating Thickness (μm) | 73 | 75 | 79 |
| Smoothness of Paint Coating Visual Evaluation | Good | Good | Good |
| Gloss Sharpness gloss at 60° | 92 | 95 | 94 |
| Mar Resistance | 88 | 86 | 87 |
| 20° Gloss Retention (%) | | | |
| Adherence | Excellent | Excellent | Excellent |
| Recoatability | Excellent | Excellent | Excellent |

TABLE 4

No. 5

| Name of Powder Paint | T-13 | T-14 | T-15 |
|---|---|---|---|
| Curing Conditions (° C./20 mins) | 160 | 140 | 140 |
| Coating Thickness (μm) | 75 | 72 | 73 |
| Smoothness of Paint Coating Visual Evaluation | passable | poor | poor |
| Gloss Sharpness gloss at 60° | 85 | 78 | 82 |
| Mar Resistance | 28 | 36 | 31 |
| 20° Gloss Retention (%) | | | |
| Adherence | Excellent | Excellent | good |
| Recoatability | good | good | poor |

Outline of the Evaluation of the Various Properties of the Paint Coating

Coat Thickness—Measured by means of an Electromagnetic Coating Thickness Measuring Device Smoothness—Evaluated as Excellent, Good, Possible, and Poor by Means of Visual Evaluation Excellent: exceptionally smooth flat paint surface Good: small roundness present Passable: large roundness present Poor: large roundness present, noticeable wrinkling and the appearance of the paint coating is remarkably poor Sharpness: 60° Gloss (60° Specula Reflectivity: %) was measured using a gloss meter Mar Resistance: Cleanser resistance was measured In this measurement method a flannel cloth was immersed in 5% water dispersible liquid cleanser and the surface was rubbed back and forth 50 times. The 20° gloss (20° specula reflectivity: %) of the surface before and after the rubbing was measured. Gloss retention (%) were calculated from these measurements.

Adherence—A painted sheet was immersed in 40° C. water for 10 days, 30 minutes after removal, a cross cut was made and separation test was conducted using adhesive tape.

Excellent: Absolutely no evidence of peeling

Good: A little evidence of peeling between the substrate and the top coat

Poor: Evidence of remarkable peeling between layers

Recoatability: A painted sheet was baked again for 20 minutes at the same temperature as when that paint coat made, then, the same type of paint was applied a second time, then, a cross cut was made in the paint surface, and an adhesiveness evaluation test was conducted by means of a separation method using adhesive tape.

Excellent: Absolutely no evidence of peeling

Good: A little evidence of peeling between the first layer and the top coat

Poor: Evidence of remarkable peeling between layers
These results are shown together in Table 4.

Embodiments 13–15

For all of these examples, paint coatings were formed by making a two coat one back coating following a so called multi-layer paint coating forming method in the following way using the respective powder paints (T-1) to (T-12) obtained in Reference Examples 4–15, and evaluation tests were conducted on all the properties of the these paint coatings. The paint coating substrate used in this case was given the following pretreatment.

In more detail, a soft steel plate was used which had been treated using a "bondelight #3030" (the product name of a zinc phosphate treating agent manufactured by Nippon Parkariaing Ltd.)" was electrocoated with epoxy resin type cationic electrode-deposition paint and to the surface of this an amino polyester resin type second coat is applied to the surface.

First, the water-based metallic paint (X-1) obtained in Reference Example 20 was applied two separate times under a paint coating atmosphere having a temperature of 25° C. and a relative humidity of 65–70% such that the dried coating thickness was 20 μm.

Between each of these two paint coatings, two minutes were allowed for setting. For the first coating, the air pressure of the spray gun was 5 Kg/cm2, the flow rate for the paint was 400 m/minute. For the second coating, the flow rate for the paint was 200 m/minute and the spray gun was held at a distance of 40 cm from the paint coating substrate.

Moreover, the paint coating substrate was always maintained in such a way that the application surface of the paint coating substrate was vertical.

The paint coating after the above-mentioned two applications was blow dried at a temperature of 30° C. for 5 minutes. Next, after cooling to room temperature, powder paints (T-1) to (T-3) were applied using an powder paint electro spray coater, and then these paint coated plates were baked under the same conditions shown in Table 4, and thereby test plates on which hardened paint coatings were formed were obtained.

TABLE 5

No. 1

| Name of Top Coat Paint | T-1 | T-2 | T-3 |
|---|---|---|---|
| Name of Base-coat Paint | X-1 | X-1 | X-1 |
| Top Coat Thickness (μm) | 75 | 73 | 72 |
| Smoothness of Paint Coating Visual Evaluation | good | good | good |
| Gloss Sharpness gloss at 60° | 92 | 93 | 92 |
| Mar Resistance | 74 | 76 | 84 |
| 20° Gloss Retention (%) | | | |
| Adherence Between Layers | Excellent | Excellent | Excellent |
| Metallic Effect | Excellent | Excellent | Excellent |

Embodiments 16–18

First, the water-based metallic paint (X-2) obtained in Reference Example 21 was applied in the same manner as in Embodiment 13, then powder paints (T-4) to (T-6) were applied using a powder paint electro spray coater, and then these paint coated plates were baked under the same conditions shown in Table 4, and thereby test plates on which hardened paint coatings were formed were obtained.

TABLE 5

No. 2

| Name of Top Coat Paint | T-4 | T-5 | T-6 |
|---|---|---|---|
| Name of Base-coat Paint | X-2 | X-2 | X-2 |
| Top Coat Thickness (μm) | 77 | 73 | 76 |
| Smoothness of Paint Coating Visual Evaluation | good | good | good |
| Gloss Sharpness gloss at 60° | 91 | 96 | 93 |
| Mar Resistance | 88 | 88 | 91 |
| 20° Gloss Retention (%) | | | |
| Adherence Between Layers | Excellent | Excellent | Excellent |
| Metallic Effect | Excellent | Excellent | Excellent |

Embodiments 19–21

First, the water-based metallic paint (X-3) obtained in Reference Example 22 was applied in the same manner as in Embodiment 1, then powder paints (T-7) to (T-9) were applied using a powder paint electro spray painter, and then these paint coated plates were baked under the same conditions shown in Table 4, and thereby test plates on which hardened paint coatings were formed were obtained.

TABLE 5

No. 3

| Name of Top Coat Paint | T-7 | T-8 | T-9 |
|---|---|---|---|
| Name of Base-coat Paint | X-3 | X-3 | X-3 |
| Top Coat Thickness (μm) | 71 | 72 | 75 |
| Smoothness of Paint Coating Visual Evaluation | good | good | good |
| Gloss Sharpness gloss at 60° | 92 | 95 | 93 |
| Mar Resistance | 89 | 87 | 87 |
| 20° Gloss Retention (%) | | | |
| Adherence Between Layers | Excellent | Excellent | Excellent |
| Metallic Effect | Excellent | Excellent | Excellent |

Embodiments 22–24

First, paint coating plates obtained by applying powder paints (T-10) to (T-12), to which Compound D as shown in the above-mentioned general formula [I-1] had been added, were applied in the same way as in Embodiment 1, and then these paint coating plates were baked under the same conditions shown in Table 4, and thereby test plates on which hardened paint coatings were formed were obtained.

TABLE 5

No. 4

| Name of Top Coat Paint | T-10 | T-11 | T-12 |
|---|---|---|---|
| Name of Base-coat Paint | X-3 | X-3 | X-3 |
| Top Coat Thickness (μm) | 75 | 74 | 78 |
| Smoothness of Paint Coating Visual Evaluation | good | good | good |
| Gloss Sharpness gloss at 60° | 90 | 93 | 91 |
| Mar Resistance | 88 | 89 | 87 |
| 20° Gloss Retention (%) | | | |
| Adherence Between Layers | Excellent | Excellent | Excellent |
| Metallic Effect | Excellent | Excellent | Excellent |
| NOTE: | Cymer 327 | Powderlink 1174 | "Primid XL-552" |

COMPARATIVE EXAMPLES 4–6

For comparison and contrast, powder paints (T-13) and (T-14), in which epoxy-group-containing vinyl-type compound (C) which has a glass transition temperature of 0° C. or less was not used; and powder paint (T-15), which had been adjusted by means of adding vinyl-type copolymer flowing agent "modaflow resin" (manufactured by Monsanto of the United States of America) which is substantially without functional groups compared with powder paint (T-14), were applied to a paint coating plate in the same way as in Embodiment; then this paint coating plates were baked under the same conditions shown in Table 4, and thereby test plates on which cured paint coatings were formed, were obtained.

TABLE 5

| | No. 5 | | |
| --- | --- | --- | --- |
| Name of Top Coat Paint | T-13 | T-14 | T-15 |
| Name of Base-coat Paint | X-1 | X-3 | X-3 |
| Coat Thickness (μm) | 76 | 78 | 73 |
| Smoothness of Paint Coating Visual Evaluation | possible | poor | poor |
| Gloss Sharpness gloss at 60° | 85 | 75 | 81 |
| Mar Resistance 20° Gloss Retention (%) | 25 | 35 | 36 |
| Adherence Between Layers | good | good | passable |
| Metallic Effect | good | good | passable |

For each of the test plates on which hardened paint coatings had been formed and which had been obtained in the above-mentioned way, evaluation of the various properties of paint coating was conducted. More specifically, each of the coating thickness, the smoothness, the sharpness, the mar resistance, the interlayer adherence, and the metallic effect of the paint coatings were observed or measured. Moreover, an outline of this evaluation of the various properties of the paint coating is set out below.

Outline of the Evaluation of the Various Properties of the Paint Coating

Coat Thickness—Measured by means of an Electromagnetic Coating Thickness Measuring Device Smoothness—Evaluated as Excellent, Good, Possible, and Poor by Means of Visual Evaluation Excellent: exceptionally smooth flat paint surface Good: small roundness present Passable: large roundness present Poor: large roundness present, noticeable wrinking and the appearance of the paint coating is remarkably poor Sharpness: 60° Gloss (60° Specula Reflectivity: %) was measured using a gloss meter Mar Resistance: Cleanser resistance was measured. In this measurement method, a flannel cloth was immersed in 5% water dispersible liquid cleanser and the surface was rubbed back and forth 50 times. The 20° gloss (20° specula reflectivity: %) of the surface before and after the rubbing was measured. Gloss retention (%) were calculated from these measurements.

Adherence Between Layers: A painted sheet was immersed in 40° C. water for 10 days, 30 minutes after removal, a cross cut was made and separation test was conducted using adhesive tape.

Excellent: Absolutely no evidence of peeling

Good: A little evidence of peeling between the substrate and the top coat

Poor: Evidence of remarkable peeling between layers

Metallic Effect: Evaluation was in accordance with the IV value calculated from measurements made using a "ALCOPE LMR-100" (the product name of a metallic effect measuring device manufactured by Kansai Paint Co. Ltd.).

Excellent: Greater than 250

Good: 200 or greater and less than 250

Poor: Less than 200

These results are shown together in Table 5.

INDUSTRIAL APPLICABILITY OF THE INVENTION

By means of the powder paint composition and the paint coating method therefor of the present invention, a paint coating can be obtained which is superior in characteristic such as adhesiveness, recoatability, smoothness, sharpness, mar resistance, and interlayer adhesion.

For this reason, the powder paint composition and the application method of the present invention can be suitably applied to vehicles, such as automobiles and two wheeled vehicles, and construction materials, such as gates and aluminum sashes.

We claim:

1. A powder paint composition comprising:
    a resin composition obtained by adding
    a multi-functional vinyl copolymer (C) which has a glass transition temperature of 0° C. or less and which has an epoxy group
    to a composition which contains
    a polycarboxylic acid (B) and
    a multi-functional vinyl copolymer (A) which has a glass transition temperature of 40° C. or greater and which has an epoxy group.

2. A powder paint composition according to claim 1, wherein said multi-functional vinyl copolymer (A) which has a glass transition temperature of 40° C. or greater and which has an epoxy group has an epoxy equivalent of 550 or less.

3. An application method wherein a paint coating is formed by applying said powder paint composition recited in claim 1 or claim 2 onto a paint coating formed by applying a water-based paint.

4. An application method according to claim 3 wherein said water-based paint comprises a water soluble or water dispersible resin which has as a main component at least one resin selected from the group comprising a vinyl copolymer resin, a polyurethane resin, a polyurethane polyurea resin, and a polyamide resin.

5. An application method according to claim 3 wherein said water-based paint comprises particulate resin of a least one type selected form the group comprising three dimensional cross linked vinyl copolymer, polyurethane resin, polyurethane polyurea resin and poly amide resin.

6. A powder paint composition comprising:
    a resin composition obtained by adding
    a multi-functional vinyl copolymer (C) which has a glass transition temperature of 0° C. or less and which has an epoxy group
    to a composition which contains
    a polycarboxylic acid (B) and
    a multi-functional vinyl copolymer (A) which has a glass transition temperature of 40° C. or greater and which has an epoxy group; and
    further adding a compound (D) which contains at least one organic group represented by any one of the following general formulae (I-1) and (I-2):
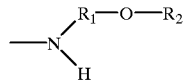
(I-1)
wherein $R_1$ represents a group which comprises —$CH_2$— or —$CH_2CH_2$— and $R_2$ represents a hydrogen atom or an alkyl group of from 1 to 12 carbons; and
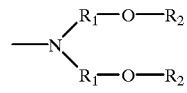
(I-2)
wherein $R_1$ represents a group which comprises —$CH_2$— or —$CH_2CH_2$— and $R_2$ represents a hydrogen atom or an alkyl group of from 1 to 12 carbons.
* * * * *